Jan. 30, 1951  S. C. FOURNET  2,539,773
METHOD OF MAKING DIES FOR MANUFACTURING
POSTERIOR TEETH

Filed March 26, 1947  2 Sheets-Sheet 1

Inventor
Sidney C. Fournet
By Edward A. Laurence
Attorney

Inventor
Sidney C. Fournet
Attorney

Patented Jan. 30, 1951

2,539,773

UNITED STATES PATENT OFFICE 2,539,773

METHOD OF MAKING DIES FOR MANUFACTURING POSTERIOR TEETH

Sidney C. Fournet, New Orleans, La.

Application March 26, 1947, Serial No. 737,272

5 Claims. (Cl. 76—107)

The invention relates to new and improved artificial posterior teeth and a method of manufacturing the same.

The cusps and sulci of the artificial upper and lower posterior teeth now available in the market do not conform nor are they adaptable to the Fournet dual check abrasive segments disclosed in United States Patent No. 2,270,629, issued on January 20, 1942. Their respective cusps and sulci do not mesh or match each other and to cause them to do so would require segment and spot-grinding to the extent that their cusps and ridges are destroyed. Further their transverse ridges interlock with the cusps of the opposing teeth, which is highly objectionable.

It may be possible to make the cusps of the present artificial posterior teeth contact the segments by first attempting to grind them on a lathe uniformly and then rotating them to fit the dual segments, but such operation results in throwing their cusps and sulci out of proper relation; or if they are set in centric with their cusps and sulci in proper relation, the cusps will not fit the dual segments. Despite the time and labor required in either method it would be impossible to properly match the cusps and sulci and obtain satisfactory trituration.

The present invention comprises new and improved upper and lower posterior artificial teeth, in which is obtained an all cusp contact relation between the upper and lower teeth when the wearer moves the mandible laterally and protrusively, and in which is retained a perfect centric relation with the cusps and sulci meshing and matching perfectly and riding the crest of their ridges without any mesial distal interlocking.

The invention also comprises a new and improved method of manufacturing such artificial upper and lower posterior teeth.

According to the present invention all of my improved artificial posterior teeth have their cusps flattened to a common dual abrasive segment of a sphere suitable to the action of the mandible which the condyle will accept. In practice I have found a sphere having a diameter of sixteen inches suited to this purpose.

The comparison between natural posterior teeth and the new and improved artificial posterior teeth is as follows.

In the natural upper molars the transverse ridge is inclined from the mesial lingual to the distal buccal, the cusps are rounded, the mesial buccal cusp merges into the mesial marginal ridge, and the distal lingual cusp merges into the distal marginal ridge. In the improved artificial upper molars the transverse ridge is inclined in the same direction as in the upper natural molars but the mesial buccal cusps and the distal lingual cusps are flattened to the segment of a sphere and they do not merge with the marginal ridges but are separated therefrom by grooves. Thus in the new and improved artificial teeth there is a distinct marginal ridge at each end of the tooth while in the natural teeth these ridges merge with the cusps as stated supra. Thus in the artificial upper molars two additional cutting edges are provided.

In the natural lower molars the four cusps are rounded and are arranged symmetrically to the longitudinal axis of the teeth but there are no transverse ridges; again the mesial lingual and the distal buccal cusps merge, respectively, with the marginal ridges. In the new and improved artificial lower molars the cusps are flattened to the segment of the sphere and the first lower molar has two transverse ridges while the second lower molar has one transverse ridge, and in both instances said ridges are disposed from the distal lingual to the mesial buccal—the reverse of the inclination of the ridges of the new and improved artificial upper molars. Thus when the upper and lower artificial teeth have been made to conform to a common spherical segment the ridges of the lower molars ride readily over the ridges of the upper molars without danger of interlocking. Again, in the case of the new and improved artificial lower molars the mesial lingual cusps and the distal buccal cusps do not merge with the adjacent marginal ridges but are separated from the latter by grooves, thus providing additional cutting edges.

Natural upper bicuspids have a transverse ridge which is disposed substantially at right angles to the longitudinal axis of the teeth and the cusps are rounded. The new and improved upper bicuspids resemble the natural teeth except that in the artificial teeth the cusps are flattened in conformity to the segment of the sphere.

In the natural lower bicuspids the first has but one cusp while the second usually has two cusps and in both instances the cusps are rounded. Both the first and second of the new and improved artificial lower bicuspids have but one lingual cusp and the cusps are flattened to the segment of the sphere.

The perimetral edges of the flattened cusps and also the marginal ridges are smoothed and slightly rounded to avoid sharp cutting edges which might interfere with proper action of the mandible, cause chipping of the porcelain, or biting of the cheek or tongue of the wearer.

Generally speaking, in the new and improved method wax upper and lower posterior teeth are first formed, set up in upper and lower jaw models and then flattened on the dual segments. Their occlusal surfaces are then carved to form the required sulci and ridges which were described supra. The wax teeth are now invested to form molds in which are cast the master metal teeth in which are reproduced the carved occlusal surfaces of the wax models.

In the accompanying drawings, wherein is illustrated a practical embodiment of the principles of my invention, Fig. 1 is an inverted plan view of the new artificial upper right posterior teeth;

The improved artificial posterior teeth

Figure 1:
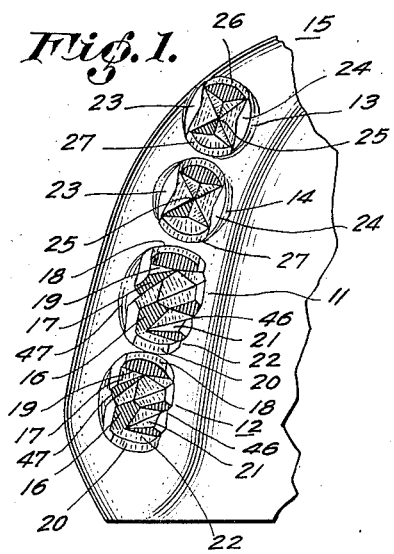
Figure 11:
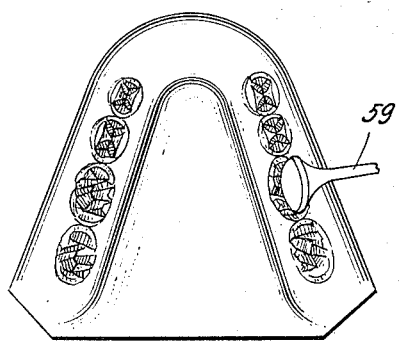
Figs. 11 and 12 are, respectively, an inverted plan of the metal upper molars and a plan view of the metal lower molars showing the sulci being spot-ground only with an emery wheel to bring them into perfect match with the flattened cusps of the opposing teeth.
Figure 12:
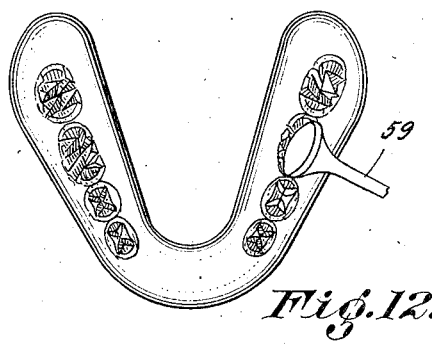

Referring first to Fig. 1, 11 and 12 indicate the improved artificial first and second upper right molars, respectively, and 13 and 14 indicate the improved artificial first and second upper right biscuspids, respectively, all set in the upper plate 15, the right half of which plate only is shown as the left artificial upper molars and bicuspids are similar to those shown.

In the molars 11 and 12, 16 indicates the transverse ridge inclined from the mesial lingual to the distal buccal. 17 indicates the mesial buccal cusp which is separated from the mesial marginal ridge 18 by the groove 19. 20 indicates the distal marginal ridge which is separated from the distal buccal cusp 21 by the groove 22. It will be observed that the cusps are not rounded as in the natural teeth but flattened to the selected spherical segment.

Referring to the upper bicuspids 13 and 14, 23 indicates the buccal cusp and 24 the lingual cusp, both of which are flattened to the selected spherical segment. 25 indicates the transverse ridge, 26 the mesial marginal ridge and 27 the distal marginal ridge.

Figure 2:
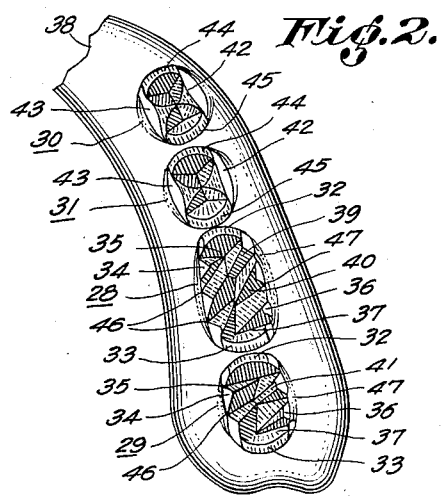
Fig. 2 is a plan view of the new artificial lower right posterior teeth.
Figure 3:
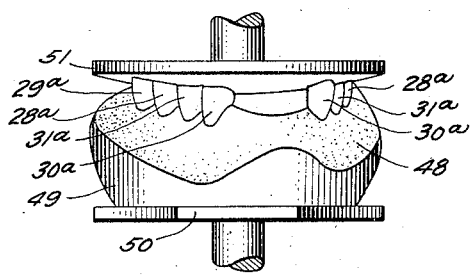
Fig. 3 is an elevation showing the wax models of the lower artificial posterior teeth mounted on the articulator for flattening the teeth to the segment of the sphere.

Referring to Fig. 2 of the drawings, 28 and 29 indicate, respectively, the lower right first and second molars, and 30 and 31 indicate, respectively, the lower right first and second bicuspids, which are set in plate 38. In the case of the molars 28 and 29, 32 indicates the mesial marginal ridge and 33 indicates the distal marginal ridge. 34 indicates the mesial lingual cusp separated from the mesial marginal ridge 32 by the groove 35. 36 indicates the distal buccal cusp which is separated from the distal marginal ridge 33 by the groove 37. In the first artificial lower molar 28 there are two transverse ridges 39 and 40 spaced from each other and from the marginal ridges and extending from the distal lingual to the mesial buccal—that is, in the opposite direction from that in which the ridges of the upper molars extend. In the second lower molar 29 there is one transverse ridge 41 which also extends from the distal lingual to the mesial buccal—the opposite direction from that in which the ridge in the corresponding upper molar extends. The cusps 34 and 36 in both the lower molars are flattened to the spherical section.

Referring now to the artificial lower bicuspids 30 and 31, they are provided with a buccal cusp 42 and one lingual cusp 43. 44 indicates the mesial marginal ridge and 45 the distal marginal ridge in the lower bicuspids. The cusps of the lower bicuspids are flattened to the spherical segment.

In Fig. 1, 46 and 47, respectively indicate the lingual and buccal sluices of the artificial upper molars, which sluices are located as in the natural teeth. As shown in Fig. 2, in the case of the first artificial lower molar the lingual sluices 46 are located between the transverse ridges, and between said ridges and the mesial lingual cusps, while the buccal sluices 47 are between the transverse ridges and between said ridges and the distal buccal cusps.

In the case of the artificial second molar the lingual sluice 46 is located between the transverse ridge and the mesial lingual cusp, while the buccal sluice 47 is located between the transverse ridge and the distal buccal cusp.

Method of forming the artificial teeth

In the manufacture of the improved artificial posterior teeth, wax molds for the upper and lower posterior teeth are formed and set in wax bite blocks and are placed on a dental articulator, preferably that disclosed in the Patent No. 2,270,629.

Thus in Fig. 3, 28a, 29a, 30a and 31a indicate wax models of the artificial lower molars 28 and 29 and of the artificial lower bicuspids 30 and 31 which which are shown in Fig. 2, set in the lower bite rim 48 which is supported by means of the lower plaster jaw model 49 upon the lower supporting plate 50 of the articulator.

The segment 51 is brought into contact with the teeth and then rotated until the occlusal surfaces of the wax teeth are flattened to the segment of the sphere. The lower jaw model with the wax teeth is then removed from the articulator and the occlusal surfaces of each of the wax teeth are carved to provide the configuration described supra.

Figure 4:
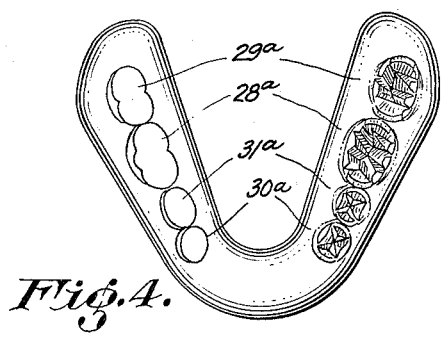
Fig. 4 is a plan view of the artificial lower posterior teeth, the teeth shown at the left of the view having been flattened to the segment of the sphere as they are taken from the articulator, while the teeth shown at the right have been carved to produce the transverse and marginal ridges and the grooves.

In Fig. 4 at the left are shown the lower posterior wax teeth with the flattened occlusal surfaces formed as stated above, while at the right the teeth with their occlusal surfaces carved to the desired configuration are shown.

Figure 5:
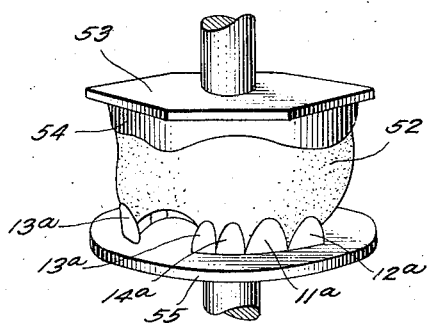
Fig. 5 is an elevation showing the wax models of the artificial upper posterior teeth as they are flattened to the segment of the sphere on the articulator.

In Fig. 5 the wax models 11a, 12a, 13a, and 14a of the first and second upper molars 11 and 12 and the first and second upper bicuspids 13 and 14, Fig. 1, are set in the upper bite rim 52 and secured to the under side of the upper model support 53 of the articulator by the plaster jaw model 54. The upper jaw grinding segment 55 is then placed in the articulator in contact with the depending wax teeth and the support 53 is rotated and the occlusal surfaces of the wax teeth 11a, 12a, 13a and 14a are ground flat to the segment 55. The segment 55 has a curvature the reverse of the segment 51.

Figure 6:
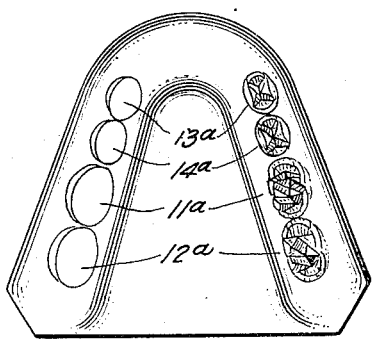
Fig. 6 is an inverted plan view showing the wax models of the artificial upper molars, the teeth to the left in the view showing their flattened surfaces produced in the articulator while those to the right are shown carved to produce the transverse and marginal ridges and the grooves described supra.

The upper jaw model with the wax teeth is then removed from the articulator and the occlusal surfaces of the wax teeth are then carved to produce the respective characteristics which were explained supra in connection with the finished artificial teeth 11, 12, 13 and 14. In Fig. 6 the teeth to the left in their flattened state are shown as they come from the articulator while the teeth to the right are shown as carved.

In carving the upper and lower wax teeth the marginal edges of the flattened cusps and the terminal ridges are smoothed and rounded.

The ground and carved wax teeth are then removed from the two bite rims and are used to form molds, which molds, after the wax teeth have been melted therefrom, are used for casting the master metal teeth 11b, 12b, 13b 14b, 28b, 29b, 30b and 31b, corresponding with the finished artificial teeth 11, 12, 13, 14, 28, 29, 30 and 31, respectively.

Figure 7:
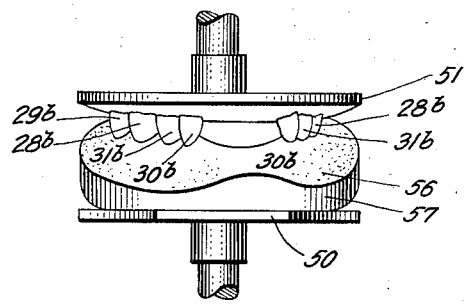
Fig. 7 is an elevation of the artificial metal lower posterior teeth, which have been cast in molds formed from the wax teeth set up on the articulator.

The lower metal master teeth 28b, 29b, 30b and 31b are then set up in a lower bite rim 56 on a lower jaw model 57 which is mounted on the lower supporting plate 50 of the articulator, as shown in Fig. 7, with all the lingual and buccal cusps contacting the segment except the lingual cusps of the first bicuspids, and the teeth are slightly ground so that they are true to the segment.

Figure 8:
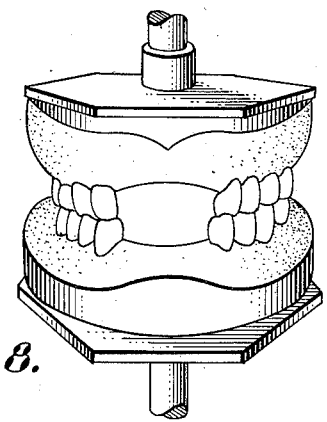
Fig. 8 is an elevation showing the upper and lower posterior metal teeth set up in centric relation on the articulator.

In Fig. 8 the upper and lower metal teeth are shown mounted on the articulator in centric with the lowers to locate the proper relation between them.

Figure 9:
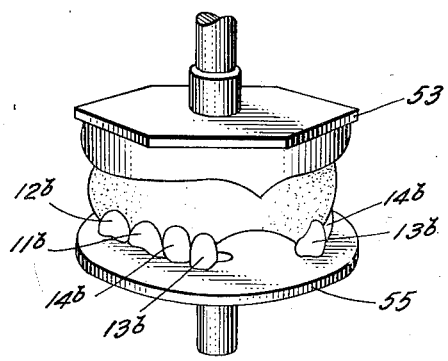
Fig. 9 is an elevation showing the lower model jaw and its support replaced in the articulator by the lower segment for checking the contact of the flattened cusps with the segment.

In Fig. 9 the lower jaw model 57 with the supporting plate 50 has been removed from the articulator and replaced by the abrasive segment 55 which is brought into contact with the occlusal surfaces of the depending metal teeth, and the degree of contact between the segment and the cusps of the metal teeth is checked and, if necessary, the upper jaw model 53 is rotated slightly so that the cusps are true to the segment.

Figure 10:
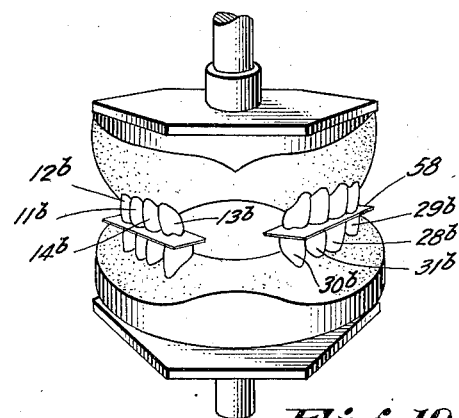
Fig. 10 is a view like Fig. 8 showing carbon introduced between the upper and lower teeth so the occlusal surfaces of the upper and lower teeth may be carbon spotted preparatory to spot-grinding the sulci only to conform to opposing cusps.

The upper and lower model jaws with the bite rims and the master metal teeth set up in the rims are then placed in the articulator with the occlusal surfaces of the upper and lower teeth opposed, as shown in Fig. 10. The jaws are then slightly separated and carbon tissue 58 inserted between the same, as shown in said view. The jaws are then brought into position with the teeth in occlusion and slightly rotated in relation to each other to carbon-mark the teeth.

The two model jaws are then removed and the sulci are spot-ground, as shown in Figs. 11 and 12, where the carbon indicates, as by the grinding wheel 59, until the cusps of the opposing teeth match perfectly with the sulci. The cusps, which have previously been ground to the segment are not spot-ground but the sulci are spot-ground to match the cusps.

In this operation, to obtain a satisfactory occlusal relation between the cusps and sulci, it is necessary to repeat the carbon spotting and grinding steps until the cusps fit the sulci of the opposing teeth evenly and ride the ridges of the latter.

The metal master teeth are then removed and are used as dies to produce molds in which porcelain is cast to form the artificial teeth 11, 12, 13, 14, 28, 29, 30 and 31.

I claim:

1. The method of producing master teeth to serve as dies for forming molds to be used in the manufacture of complementary sets of upper and lower posterior artificial teeth, which comprises the steps of forming wax models of the upper and lower posterior teeth on bite rims, grinding the occlusal surfaces of the wax teeth to complementary spherical surfaces, carving the spherically ground occlusal surfaces of the wax teeth to produce sulci leaving cusps, investing the carved wax teeth to form molds, casting master metal teeth in the molds, setting the upper and lower posterior metal teeth on bite rims, finish grinding the occlusal surfaces of the upper and lower posterior metal teeth to complementary spherical surfaces, and spot grinding the sulci of the metal teeth until the opposed cusps match and slide out of the opposing sulci.

2. In the method of producing master teeth to serve as dies for forming molds to be used in the manufacture of complementary sets of upper and lower posterior artificial teeth, which comprises grinding the occlusal surfaces of the upper and lower posterior wax teeth to complementary spherical surfaces, carving the spherically ground occlusal surfaces of the wax teeth to produce sulci leaving cusps, investing the carved wax teeth to form molds, casting master metal teeth in the molds, and spot grinding the sulci of the metal teeth until the opposed cusps match and slide out of the opposing sulci.

3. In the method of producing master teeth to serve as dies for forming molds to be used in the manufacture of complementary sets of upper and lower posterior artificial teeth, which comprises grinding the occlusal surfaces of the upper posterior wax teeth to a convex spherical surface, grinding the occlusal surfaces of the lower posterior wax teeth to a concave spherical surface complementary to the convex surface of the upper teeth, carving the spherically ground occlusal surfaces of the wax teeth to produce sulci leaving cusps, investing the carved wax teeth to form molds, casting master metal teeth in the molds, and spot grinding the sulci of the metal teeth until the opposed cusps match and slide out of the opposing sulci.

4. In the method of manufacturing artificial posterior teeth, which comprises grinding the occlusal surfaces of the upper and lower posterior wax teeth to complementary spherical surfaces, carving the spherically ground occlusal surfaces of the wax teeth to produce sulci leaving cusps, investing the carved wax teeth to form molds, casting master metal teeth in the molds, spot grinding the sulci of the metal teeth until the opposed cusps match and slide out of the opposing sulci, forming molds from the master metal teeth, and casting porcelain artificial teeth in said last mentioned molds.

5. The method of manufacturing artificial posterior teeth, which comprises forming wax models of the upper and lower posterior teeth on bite rims, grinding the occlusal surfaces of the upper posterior wax teeth to a selected convex spherical surface, grinding the occlusal surfaces of the lower posterior wax teeth to a concave spherical surface complementary to the convex surface of the upper teeth, carving the spherically ground occlusal surfaces of the wax teeth to produce sulci leaving cusps, investing the carved wax teeth to form molds, casting metal teeth in the molds, setting the upper and lower posterior metal teeth on bite rims, finish grinding the occlusal surfaces of the upper and lower posterior metal teeth to complementary spherical surfaces, spot grinding the sulci of the metal teeth until the opposed cusps match and slide out of the opposing sulci, investing the master metal teeth to form molds, and casting porcelain artificial teeth in said last last mentioned molds to produce similar artificial teeth for dentures.

SIDNEY C. FOURNET.

REFERENCES CITED

The following references are of record in the file of this patent:

UNITED STATES PATENTS

| Number | Name | Date |
|---|---|---|
| 380,021 | Carroll | Mar. 27, 1888 |
| 909,696 | Shimura et al. | Jan. 12, 1909 |
| 992,199 | Hutchinson | May 16, 1911 |
| 1,002,889 | Whittemore | Sept. 12, 1911 |
| 1,598,178 | Valentine | Aug. 31, 1926 |
| 1,745,570 | Dimelow | Feb. 4, 1930 |
| 1,803,478 | Laukel | May 5, 1931 |
| 2,050,837 | Gysi | Aug. 11, 1936 |
| 2,072,127 | Pilkington et al. | Mar. 2, 1937 |
| 2,106,125 | Roebuck et al. | Jan. 18, 1938 |
| 2,204,123 | Collins | June 11, 1940 |
| 2,258,473 | Scott | Oct. 7, 1941 |
| 2,416,983 | Dickson | Mar. 4, 1947 |
| 2,441,747 | Beshgetoor | May 18, 1948 |
| 2,466,272 | Porter et al. | Apr. 5, 1949 |